United States Patent [19]

Pfeifer et al.

[11] 4,096,486

[45] Jun. 20, 1978

[54] RECORDER

[75] Inventors: Josef Pfeifer, Unterhaching; Rudolf Paulus, Munich; Walter Gutmann, Lochhofen; Michael Resch, Munich, all of Germany

[73] Assignee: AGFA-Gevaert AG, Leverkusen, Germany

[21] Appl. No.: 815,415

[22] Filed: Jul. 13, 1977

[30] Foreign Application Priority Data

Jul. 15, 1976 Germany .................. 2631849

[51] Int. Cl.² ............... G01D 9/42; G03B 41/00; B41B 13/00
[52] U.S. Cl. .................. 346/107 R; 354/4; 354/5
[58] Field of Search ............ 346/107 R; 354/4, 5, 354/7

[56] References Cited

U.S. PATENT DOCUMENTS

| | | | |
|---|---|---|---|
| 3,438,057 | 4/1969 | Neitzel | 346/107 R |
| 3,449,758 | 6/1969 | Lavine | 346/107 R |
| 3,464,330 | 9/1969 | Lewis | 354/4 |
| 3,832,488 | 8/1974 | Fahey et al. | 354/7 X |
| 3,836,917 | 9/1974 | Mee | 354/5 |
| 3,952,311 | 4/1976 | Lapeyre | 346/107 R X |
| 4,000,495 | 12/1976 | Pirtle | 346/107 R X |
| 4,050,811 | 9/1977 | Russell | 346/107 R X |
| 4,057,808 | 11/1977 | Shafer | 346/107 R |

*Primary Examiner*—George H. Miller, Jr.
*Attorney, Agent, or Firm*—Michael J. Striker

[57] ABSTRACT

An image consisting of a multitude of image points is formed by effecting relative transport between a plurality of light-emitting diodes and a recording medium. The diodes are arranged in rows. The rows are arranged successively in the transport direction. The rows extend at an angle relative to the transport direction. The diodes of each single row are offset relative to those of the other row, in direction transverse to the transport direction, by an amount equal to the distance between adjoining diodes in a single row divided by the number of rows, and/or multiples of that amount. Each diode is provided with an optical unit which projects onto the recording medium a reduced image of the light emitted by the diode. The diode-control signals corresponding to a single line of image points of the image to be formed are applied to the individual diodes with different respective time delays dependent upon the rate of transport and corresponding to the different distances among the rows as measured in the transport direction.

7 Claims, 3 Drawing Figures

RECORDER

BACKGROUND OF THE INVENTION

The invention relates to recorders which form an image consisting of a multitude of image points by effecting relative transport between a recording medium and a plurality of light-emitting elements, preferably light-emitting diodes, and energizing the light-emitting elements in correspondence to the image points to be formed on the recording medium.

Such a recorder is disclosed, for example, in Swiss Pat. No. 568,593. In that recorder, a row of light-emitting diodes (LED's) is arranged above the line on a recording medium onto which a line of image points is to be formed. The number of LED's in the row of LED's is equal to the number of image points contained in a line of image points to be formed on the recording medium. Because the density with which the LED's can be spaced within the line of LED's is limited by the relatively large dimensions of the LED's themselves, the resolution of the image which can be formed is correspondingly limited.

SUMMARY OF THE INVENTION

It is the general object of the invention to provide a recorder of the type in question with considerably increased resolution.

According to one concept of the invention, this is achieved by providing optical means for projecting onto the recording medium reduced images of the light emitted by the individual light-emitting diodes. The LED's are arranged in a plurality of rows. Each row extends at an angle to the transport direction. The rows are arranged in succession, considered in the transport direction. The LED's of each row are offset relative to those of the other rows, in direction transverse to the transport direction, by an amount equal to the distance between adjoining LED's in a single row divided by the number of rows, or a multiple of that amount. An electrical control circuit applies to the individual LED's electrical control signals corresponding to the image points to be formed on the recording medium.

For any given transverse line of image points to be formed, the control signals associated with this line are applied to the different rows of LED's with different respective time delays. The control signals applied to the LED's of the $n^{th}$ row (as counted in the transport direction) are delayed in time relative to those applied to the LED's of the first row by a time interval which corresponds to the spacing between the first and $n^{th}$ rows and which takes into account the average speed of relative transport between the LED's and the recording medium.

The invention provides a recorder which makes possible a very great increase of image resolution, compared to the prior art, at relatively little expense.

According to another concept of the invention, the LED's are arranged in rows which extend at right angles to the transport direction. The LED's of adjoining rows are offset, in direction perpendicular to the transport direction, by a distance equal to the distance between adjoining LED's in a single row divided by the number of rows. The sense of the offset is always the same as one proceeds from one row of LED's to the next. The spacing between adjoining rows of LED's is preferably equal to the spacing between adjoining LED's within a single row. With this preferred concept, the organization of the LED's and the routing of control signals to the LED's is particularly orderly and easy to visualize.

To properly time the application of control signals to the individual LED's of the LED cluster, it is preferred to utilize a shift register having a number of shift-register stages equal to the number of image points in a transverse line of image points to be formed on the recording medium. Parallel-read-out signal-transmission lines are provided; each extends from the output of a respective one of the shift-register stages to a respective one of the LED's in the LED cluster. The transmission lines connected to the LED's of the first row (as counted in the transport direction) can be directly connected, i.e., without the intermediary of time-delay means. The transmission lines connected to the LED's of the second through last LED-row are each provided with a respective time-delay shift register. Each such time-delay shift register has a number of shift-register stages equal to $(n-1) \cdot N$, where $n$ is the number of the respective row (as counted in the transport direction) and $N$ is the total number of LED-rows.

With this preferred concept, the electrical control signals corresponding to the image points to be formed are written-in linewise into the main shift register; i.e., the control signals corresponding to the image points in a single line of image points to be formed upon a certain transversely extending linear portion of the recording medium are written-in serially into the main shift register. These signals are then transmitted to the respective individual LED's via the parallel-read-out signal-transmission lines. The time-delay shift registers provided for the second through Nth LED-rows assure that control signals associated with the line in question are not applied to the LED's of any single row until such time as that row is in register with the linear portion of the recording medium on which the line image of points in question is to be actually formed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
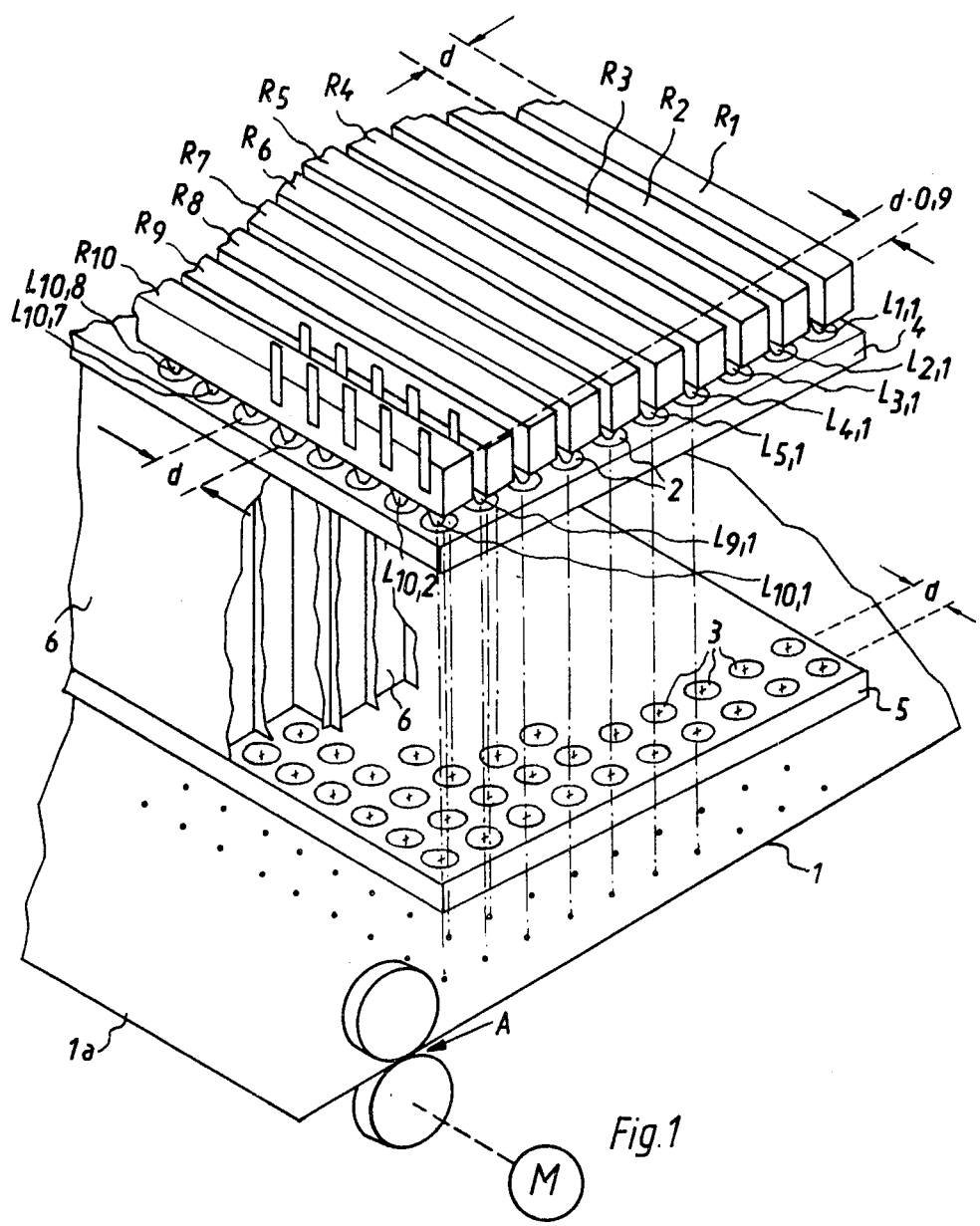
FIG. 1 depicts in perspective an exemplary embodiment of the invention.

FIG. 1 depicts in perspective view an exemplary embodiment of the inventive construction. A recording medium 1 provided with a light-sensitive surface 1a is transported in the direction indicated by arrow A, by a drive mechanism D, driven by a motor M. Stationarily mounted above the recording medium 1 are 10 rows $R_1$ to $R_{10}$ of LED's. Each row $R_1$ to $R_{10}$ extends at a right angle to the transport direction A. Each row contains 83 LED's, uniformly spaced by a distance $d$. The individual LED's are denoted by $L_{i,k}$, where $i$ is the row number ($i = 1$ to 10) and $k$ is the diode number with a row ($k = 1$ to 83). The distance between adjoining LED-rows is the same for all rows, and is equal to the distance $d$ between adjoining LED's of a single row. The LED's of each row $R_1$ to $R_{10}$ are offset relative to those of the next row, in the direction of elongation of the rows, by a distance equal to 1/10 of the distance $d$.

Each individual LED is provided with a respective field lens 2 and a respective projector lens 3, by means of which the light emitted from the LED is projected onto the light-sensitive surface of the recording medium 1 with reduced scale. The distribution of the lenses 2 and 3 upon the preferably identical lens plates 4 and 5 corresponds to the distribution of the cluster or array of LED's. Walls 6 extend between the two lens plates 4 and 5 and form individual light chutes for the light paths of the individual LED's, in order to isolate the light paths of the individual LED's from one another.

Figure 2:
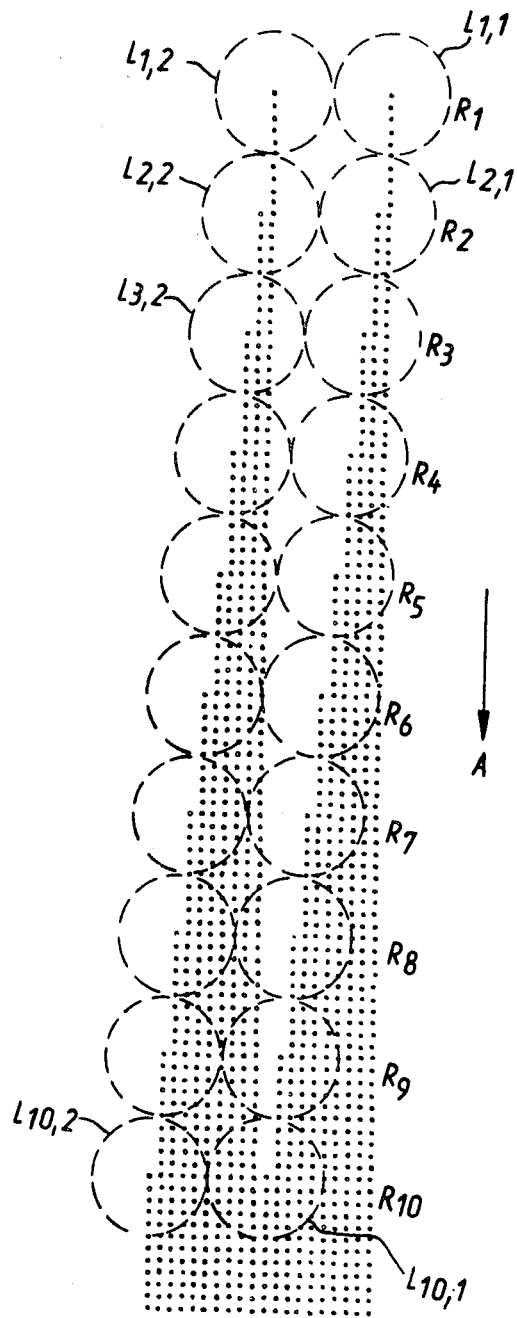
FIG. 2 illustrates the scheme according to which the image points of a line of image points are formed on the recording medium by the cluster of LED's.

FIG. 2 illustrates the scheme according to which successive lines of image points are formed on the recording medium 1 using the cluster of LED's. Each transverse line of image points to be formed on the recording medium consists of 830 image points. Image points are depicted in FIG. 2 by black dots. FIG. 2 depicts the succession in which the rightmost 20 image points of successive lines of image points are being formed.

The LED's $L_{1,1}$, $L_{1,2}$, ..., $L_{1,83}$ of the first LED-row $R_1$ produce the first, eleventh, twenty-first, etc., image points (as counted from the right in FIG. 2) of each and every line of 830 image points. This can be seen for the uppermost line of image points shown in FIG. 2; in this uppermost line of image points, only the first, eleventh, twenty-first, etc., image points have been produced so far.

The LED's of the second LED-row $R_2$ produce the second, twelfth, twenty-second, etc., image ponts (as counted from the right in FIG. 2) of each and every line of 830 image points. This can be seen in FIG. 2 by considering the black dots located at the exact centers of the circles representing LED's $L_{2,1}$ and $L_{2,2}$. These two dots represent the second and twelfth image points (counting from the right) within a single row of 830 image points undergoing formation; the first, eleventh, twenty-first, etc., image points have already been formed by the LED's of row $R_1$; the other image points of the line of 830 image points will not be formed until the line on the recording medium reaches the subsequent LED-rows $R_3$ to $R_{10}$.

As the transversely extending linear portion of the recording medium 1 on which a single row of 830 image points is to be formed moves into register with the successive LED-rows $R_1$ to $R_{10}$, 83 image points are added to the image-point line by each row, until finally all 830 image points of the image-point line have been produced. As shown in FIG. 2, the LED's of LED-row $R_{10}$ complete the 830-image-point line by adding thereto the last 83 image points thereof, i.e., the tenth, twentieth, thirtieth, etc., image points, all the other image points having already been formed.

As explained in detail below, a shift-register control circuit is preferably used to apply control signals corresponding to a single line of image points to the LED's of successive rows with different respective time delays. In this way, the control signals corresponding to a single line of image points do not become applied to the various LED's of the LED-cluster until the portion of the recording medium on which the image-point line is to be formed actually arrives into register with the LED-row containing the respective LED.

Figure 3:
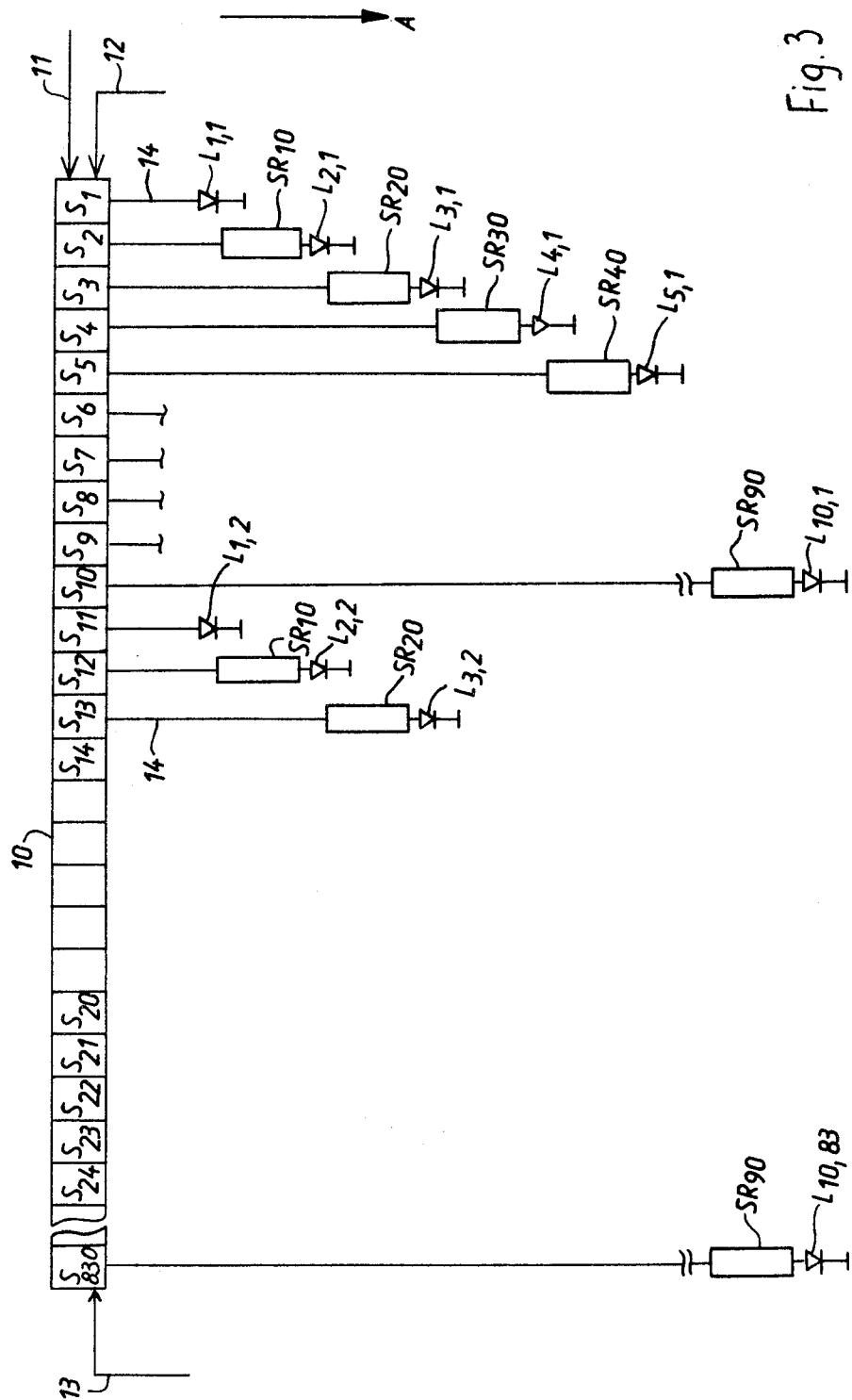
FIG. 3 illustrates a control circuit for controlling the operation of the individual LED's in the cluster of LED's.

FIG. 3 depicts an exemplary shift-register control circuit. Numeral 10 denotes a main shift register having 830 shift-register stages $S_1$ to $S_{830}$. Thus, register 10 has one shift-register state for each image point in a transverse line of image points to be formed on the recording medium. Each shift-register stage is provided with a respective parallel-read-out signal-transmission line 14. Each of the 830 transmission lines 14 connects the output of a respective one of the shift-register stages to a respective one of the 830 LED's of the LED-cluster.

The transmission lines 14 connected to the LED's of the first LED-row $R_1$ (the LED's $L_{1,1}$, $L_{1,2}$, etc.) are directly connected to the respective LED's, i.e., without the intermediary of time-delay means.

The other transmission lines 14 are connected to their respective LED's through the intermediary of time-delay shift registers $SR_{10}$, $SR_{20}$, $SR_{30}$, ..., $SR_{90}$.

The shift registers in the transmission lines 14 connected to LED's of the second LED-row are all denoted by $SR_{10}$, and each has 10 shift-register stages. The shift registers in the transmission lines 14 connected to the LED's of the second LED-row are all denoted by $SR_{20}$, and each has 20 shift-register stages. Etc.

The 830 control signals (digital or analog) corresponding to the 830 image points of a single line of image points to be formed are written-in into the shift register 10 serially, via the serial-write-in line 11. The serial write-in operation is performed at a rate determined by the shift pulses applied to shift-pulse line 12. Application of a control pulse to read-out line 12 effects parallel read-out of all 830 shift-register stages, i.e., transmission of the individual control signals to the associated LED's or to the intermediate time-delay shift registers, as the case may be. The timing and speed of the write-in and read-out of the main shift register 10 are correlated with the transport speed of the recording medium, when it is the recording medium that is being transported. The write-in and read-out operations are performed within a time interval equal to the time required for the recording medium to be transported a distance equal to the spacing between adjoining transverse lines of image points of the image to be formed.

The shift registers $SR_{10}$ to $SR_{90}$ serve as buffer storages. They assure that each group of control signals read out from main shift register 10 (e.g., the group of control signals read out from stages $S_3$, $S_{13}$, $S_{23}$, etc.) are not applied to the associated LED's simultaneously with the application of the group of signals applied to LED-row $R_1$ (LED's $L_{1,1}$, $L_{1,2}$, $L_{1,3}$, etc.). Instead, the groups of control signals are applied to the second through tenth LED-rows only at such a time as the transversely extending linear portion of the recording medium on which the line of image points in question is to be formed, actually moves into register with the respective LED-row.

The shift registers $SR_{10}$ to $SR_{90}$ are, in general, each comprised of $(n - 1) \cdot N$ shift-register stages, where $n$ is the number of the LED-row to which the shift register is connected (as counted in the transport direction), and $N$ is the total number of LED-rows. Accordingly, relative to the time of application of the first group of control signals of an image line to first LED-row $R_1$, the times of applications of the second through tenth groups of control signals of the image line to the successive LED-rows $R_2$, $R_3$, ..., $R_{10}$ are time-delayed by intervals corresponding to 10, 20, 30, ..., 90 exposure cycles, corresponding to recording-medium advancement by amounts of 10, 20, 30, ..., 90 image lines.

For the sake of simplicity of illustration, the shift-pulse lines of the time-delay shift registers $SR_{10}$ to $SR_{90}$ are not shown in FIG. 3, nor are the interconnections with the synchronizing means which supply the serial-write-in control pulses to line 12, the read-out control pulse to line 13 or the shift pulses to the time-delay registers. Persons skilled in the art will appreciate that a considerable variety of synchronization techniques can be employed. In general, it is necessary that the time delays introduced by the shift registers $SR_{10}$ to $SR_{90}$ be dependent upon the rate at which relative movement between the LED's and the recording medium is occurring. Persons skilled in the art will understand that this dependence can be established in at least two ways. The drive motor for the transport means can be utilized to drive a synchronizer, e.g., an electromechanical synchronizer; equivalently, the recording medium could be provided with photoelectrically detectable synchronizing markings from which the shift pulses for the time-delay registers, and also the control signals for the main shift register, are derived, or by means of which they are timed. Alternatively, if the drive motor for the transport means is, for example, a stepper motor driven by a train of control pulses, then the stepper-motor control pulses could be derived from a synchronizing circuit which provides shift pulses to the time-delay registers and the other control pulses to the main shift register 10.

In the exemplary embodiment, the recording medium is maintained flat during the exposure operations. However, if the recording medium is provided on a cylindrical drum, for example on the photoconductive drum of a facsimile-recorder receiver, then of course the LED-rows and cooperating lenses could be arranged with a corresponding cylindrical geometry (e.g., the LED-rows could extend parallel to the axis of the cylindrical geometry).

In the exemplary embodiment, the cluster of LED's are arranged in simple rows extending at a right angle to the transport direction. These LED rows could also extend at an angle deviating somewhat from a right angle.

The structural and control-circuitry details of the exemplary embodiment exhibit a very high degree of orderlines and are very easy to visualize. For this reason, the exemplary embodiment is preferred. However, in principle, embodiments of the invention exhibiting a lower degree of orderliness, or even a somewhat disorderly organization, would be possible. The cluster of LED's arranged in the exemplary embodiment in straight, parallel rows, with uniform and regular offsets from one LED-row to the next, could be reorganized in a very great number of ways. The cluster of LED's could, in principle, be organized in a considerably more disorderly manner, it then only being necessary to correspondingly increase the number of different time delays involved. Likewise, the control of the LED's by means of shift-register circuitry is merely exemplary, but preferred because of its orderliness. It is emphasized that alternatives exhibiting a high degree of disorderliness fall within spirit and scope of the invention.

It will be understood that each of the elements described above, or two or more together, may also find a useful application in other types of circuits and constructions differing from the types described above.

While the invention has been illustrated and described as embodied in a LED-recorder exhibiting a high degree of orderliness, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A recorder operative for forming an image on a recording medium by illuminating a multitude of points on the surface of the recording medium to form lines of image points, the recorder comprising, in combination, a plurality of light-emitting elements; transport means for effecting relative movement between the light-emitting elements and a recording medium in a predetermined transport direction at a predetermined rate, the light-emitting elements being arranged in a plurality of rows, the rows being arranged successively in the transport direction, the rows extending at an angle relative to the transport direction, the elements of each single row being offset relative to the elements of the other rows in a direction transverse to the transport direction, the offsets among the elements of the individual rows being equal to $j \times d/N$, wherein $j$ is an integer including unity, $d$ is the distance between adjoining elements of a single row, and $N$ is the number of rows; optical means operative for receiving the light emitted by the individual light-emitting elements and projecting onto the recording medium a corresponding plurality of individual reduced-scale light points arranged in light point rows corresponding to the rows of light-emitting elements; and electrical control means operative for applying to the individual light-emitting elements electrical control signals determining the illumination of points on the recording-medium surface, and comprising means for effecting the formation of each line of image points by applyng to the rows of light-emitting elements respective groups of control signals all corresponding to the line of image points but delayed by respective time-delay intervals dependent upon the rate of transport and corresponding to the different distances among the light point rows as measured in the transport direction.

2. The recorder defined in claim 1, each row of light-emitting elements extending at a right angle to the transport direction.

3. The recorder defined in claim 1, the offset between the elements of each row and the elements of the next-following row being equal to $d/N$, the sense of the offset between the elements of each row and the elements of the next-following row being the same.

4. The recorder defined in claim 1, the distance between adjoining rows of light-emitting elements as measured in the transport direction being equal to the distance between adjoining light-emitting elements within a single row.

5. The recorder as defined in claim 1, the electrical control means comprising a shift register including a number of shift-register stages equal to the number of image points in a line of image points, a plurality of signal-transmission lines, each signal-transmission line connecting the output of a respective one of the shift-register stages to a respective one of the light-emitting elements, the signal-transmission lines connected to the light-emitting elements in the second through Nth rows as counted in the transport direction each including a respective time-delay shift register, each time-delay shift register including $(n - 1) \cdot N$ shift-register stages, wherein $n$ is the number of the respective row of light-emitting elements as counted in the transport direction.

6. The register defined in claim 1, the light-emitting elements being light-emitting diodes.

7. The recorder as defined in claim 1, the optical means comprising a plurality of optical means, one for each light-emitting element.

* * * * *